US006137931A

United States Patent [19]

Ishikawa et al.

[11] Patent Number: 6,137,931

[45] Date of Patent: Oct. 24, 2000

[54] METHOD FOR DETERMINING A CONDITION OF AGING FOR OPTICAL FIBER GRATING

[75] Inventors: Shinji Ishikawa; Toru Iwashima; Michiko Harumoto; Akira Inoue, all of Yokohama, Japan

[73] Assignee: Sumitomo Electric Industries, Ltd., Okasaki, Japan

[21] Appl. No.: 09/070,799

[22] Filed: May 1, 1998

[30] Foreign Application Priority Data

May 1, 1997 [JP] Japan .................................... 9-113996

[51] Int. Cl.[7] ........................................................ G02B 6/34

[52] U.S. Cl. ............................. 385/37; 359/570; 65/17.1; 65/29.18

[58] Field of Search ............................. 385/37, 123, 124; 65/425, 17.1, 29.18, 384; 359/566, 570

[56] References Cited

U.S. PATENT DOCUMENTS 5,287,427 2/1994 Atkins et al. ........................... 385/124
5,620,496 4/1997 Erdogan et al. .......................... 65/425

*Primary Examiner*—Darren E. Schuberg
*Attorney, Agent, or Firm*—Pillsbury Madison & Sutro, LLP

[57] ABSTRACT

The present invention provides a method for determining a condition of aging for an optical fiber grating. This method comprises a step of setting the aged deterioration curve of the optical fiber grating as a form proportional to $t^{-n}$, where t represents time, and n represents a parameter dependent on temperature; and a step of determining the condition of the aging according to the aged deterioration curve.

9 Claims, 14 Drawing Sheets

| Temp (°C) | Temp (K) | 1/T (1/K) | n | $C_1$ |
|---|---|---|---|---|
| 75 | 348 | 0.00287 | 0.0095 | 1.0807 |
| 85 | 358 | 0.00279 | 0.0131 | 1.1059 |
| 100 | 373 | 0.00268 | 0.0118 | 1.0017 |
| 120 | 393 | 0.00254 | 0.0199 | 1.0243 |
| 170 | 443 | 0.00226 | 0.0381 | 1.0371 |
| 220 | 493 | 0.00203 | 0.0522 | 0.9941 |
| 280 | 553 | 0.00181 | 0.0747 | 1.0115 |

Fig.4

METHOD FOR DETERMINING A CONDITION OF AGING FOR OPTICAL FIBER GRATING

BACKGROUND OF THE INVENTION

1. Field of the Invention

The present invention relates to aging for optical fiber gratings used for filters, multi/demultiplexers, dispersion-compensators, and the like in optical fiber networks.

2. Related Background Art

An optical fiber grating is an optical fiber having a region therein (mostly in its core portion) provided with a periodic change of refractive index along the longitudinal direction of the optical fiber. The region where the refractive index changes, which is known as the grating, can transmit or reflect propagated light according to its wavelength. Consequently, the optical fiber grating is applied to various kinds of optical elements such as filter, multi/demultiplexer, dispersion-compensator, and the like.

As shown in FIG. 1, a grating 20 is often formed by a method comprising the steps of preparing a silica-based optical fiber 10 in which $GeO_2$ (germanium dioxide) is added to at least its core region, irradiating this optical fiber 10 with an interference fringe formed by light 30 having a predetermined wavelength, and generating a change in refractive index corresponding to an optical energy intensity distribution of this interference fringe. Since the optical fiber 10 is usually coated with a plastic layer (not shown), a part of the coating is removed, and thus exposed part of the optical fiber 10 is irradiated with the light 30. In FIG. 1, numeral 22 indicates parts where a larger amount of increase in refractive index is induced upon the irradiation, whereas numeral 24 indicates parts where a smaller amount of increase in refractive index is induced. The grating 20 is a region where the parts 22 and 24 are alternatively and periodically disposed along the longitudinal direction of the optical fiber 10.

It has been considered that the irradiation with a certain wavelength of light generates Ge-defects in the $GeO_2$-doped portion in the silica-based optical fiber, thereby causing the change in refractive index. It has also been known that the amount of Ge-defects changes with time, whereby characteristics of the optical fiber grating deteriorate over time. In view of these points, there have been proposed techniques which perform accelerated aging for an optical fiber grating immediately after its manufacture to sufficiently suppress its aged deterioration upon operation in the market. Examples of such techniques are disclosed in U.S. Pat. Nos. 5,287,427 and 5,620,496 which are incorporated herein by reference.

In the technique disclosed in U.S. Pat. No. 5,620,496, normalized refractive index difference η is supposed to be represented by the following relational expression:

$$\eta = \frac{1}{1 + C \cdot t^{\alpha}} \qquad (1)$$

where t represents time, and C and α are functions of temperature. The normalized refractive index difference η is a value of the refractive index difference of a grating when time t has elapsed from a predetermined point of time (i.e., reference time) after formation of the grating, and this value is normalized with respect to the refractive index difference of the grating at this point of time. Namely, η=(refractive index difference at t after the reference time)/(refractive index difference at the reference time). In the technique disclosed in the above patent, the time immediately after grating formation is adopted as the reference time. The refractive index difference refers to the difference between the maximum and minimum values of refractive index in the grating.

In the conventional techniques, from the fact that η changes more rapidly as the temperature is higher, the optical fiber grating is heat-treated in an environment at a temperature higher than its operating temperature to perform the accelerated aging, in order to suppress the deterioration upon its operation.

SUMMARY OF THE INVENTION

Having studied the conventional techniques mentioned above, the inventors have found the following problems. Namely, in the above-mentioned conventional techniques, since two parameters of C and α depend on temperature in the expression (1), which represents secular change of normalized refractive index difference η, it is difficult to determine temperature and time of the heat treatment for the aging. In effect, the above-mentioned patents do not fully disclose such conditions of the aging.

It is an object of the present invention to provide a method by which a condition of the aging may be determined more easily.

More specifically, the method in accordance with the present invention comprises the step of setting the aged deterioration curve of an optical fiber grating as a form proportional to $t^{-n}$, where t represents time, and n represents a parameter dependent on temperature; and the step of determining a condition of aging according to said aged deterioration curve. By setting the aged deterioration curve as the above form, the aging condition can be determined more easily. In one embodiment, the value η1 of the normalized refractive index difference at the completion of the aging is determined as the aging condition. The temperature T1 and time t1 of the heat treatment for the aging can be determined as well from the value η1.

Another aspect of the present invention includes a method for making an optical fiber grating which is designed so that when used for an operating time of t3 at an operating temperature of T2, its deterioration is suppressed within a predetermined tolerance. This method comprises a step of forming a grating in a region in an optical fiber; and a step of aging the grating under the aging condition determined by the above-mentioned determining method. In one embodiment, the aging comprises heat-treating the grating till the normalized refractive index difference η of the grating reaches the above value η1.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4 is a table showing parameters C1 and n concerning the fitting curves shown in FIGS. 2 and 3 with respect to each temperature;

DETAILED DESCRIPTION OF THE PREFERRED EMBODIMENTS

In the following, several embodiments of the present invention will be explained in detail with reference to the accompanying drawings. Before explaining a method for making an optical fiber grating, a method for predicting aged deterioration of the optical fiber grating and determining a condition of aging process will be explained.

In the present invention, the following expression:

$$\eta = C1 \cdot t^{-n} \tag{2}$$

is employed as the expression representing secular change of normalized refractive index difference η of a grating. This expression (2) can represent aged deterioration of normalized refractive index difference η with adequate accuracy, as will be explained in more detail in the following.

In general, normalized refractive index difference η is a value of the refractive index difference of a grating when time t has elapsed from a predetermined point of time (i.e., reference time) after formation of the grating, and this value is normalized with respect to the refractive index difference of the grating at this point of time. Namely, η=(refractive index difference at t after the reference time)/(refractive index difference at the reference time). Here, the refractive index difference refers to the difference between the maximum and minimum values of refractive index in the grating. In most cases, secular change of the refractive index difference is sufficiently small if the refractive index difference is measured at a sufficiently short interval after the grating has been formed, and the measured refractive index difference may be considered to be equal to the refractive index difference at the time the formation of the grating was completed. Accordingly, normalized refractive index difference η with respect to the above measured refractive index difference can be considered as representing a ratio of the refractive index difference at t after the completion of the formation of the grating to the refractive index difference at the completion of the formation of the grating.

Figure 1:
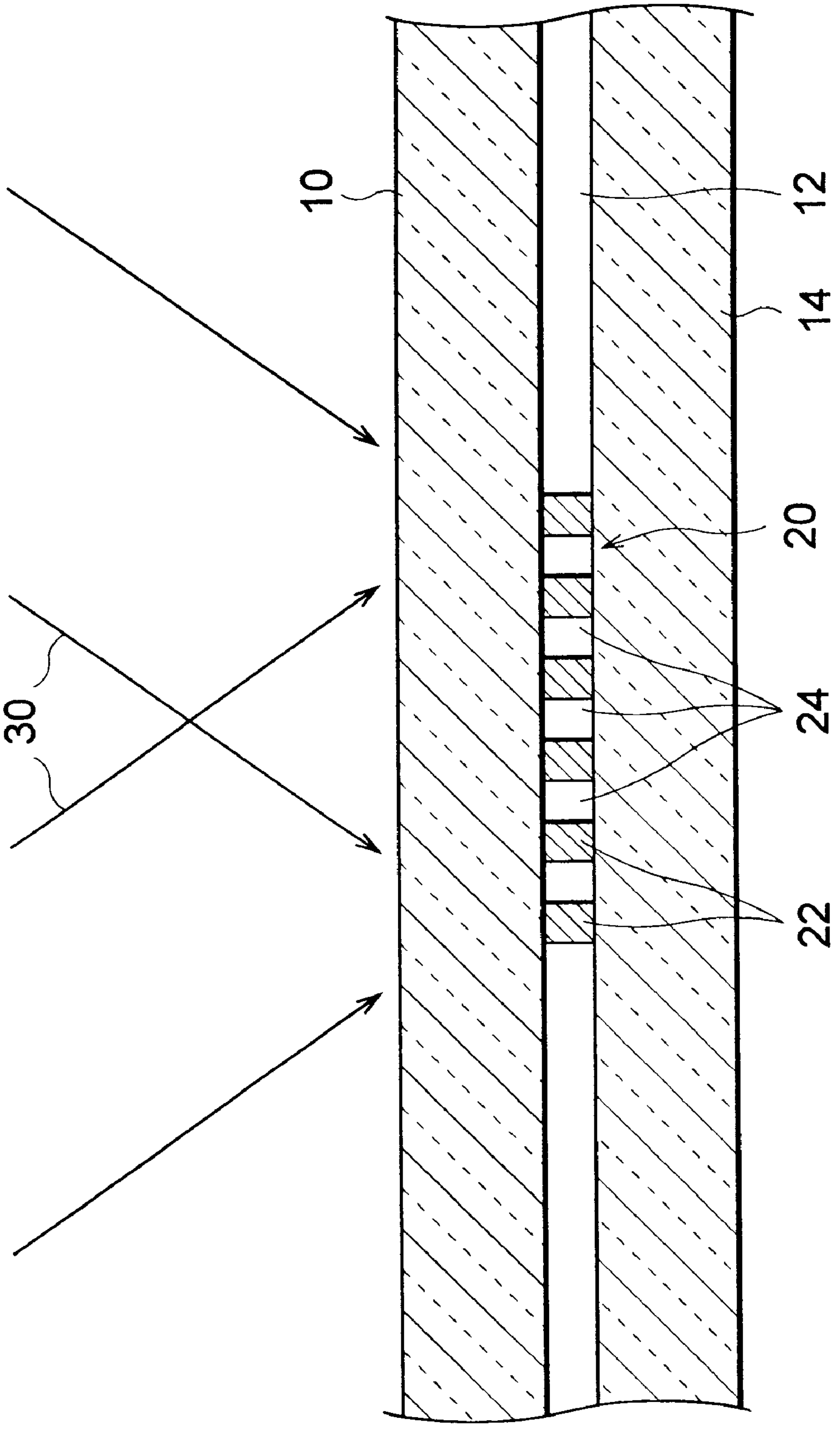
FIG. 1 is a view showing a method for photowriting a grating into an optical fiber.
Figure 2:
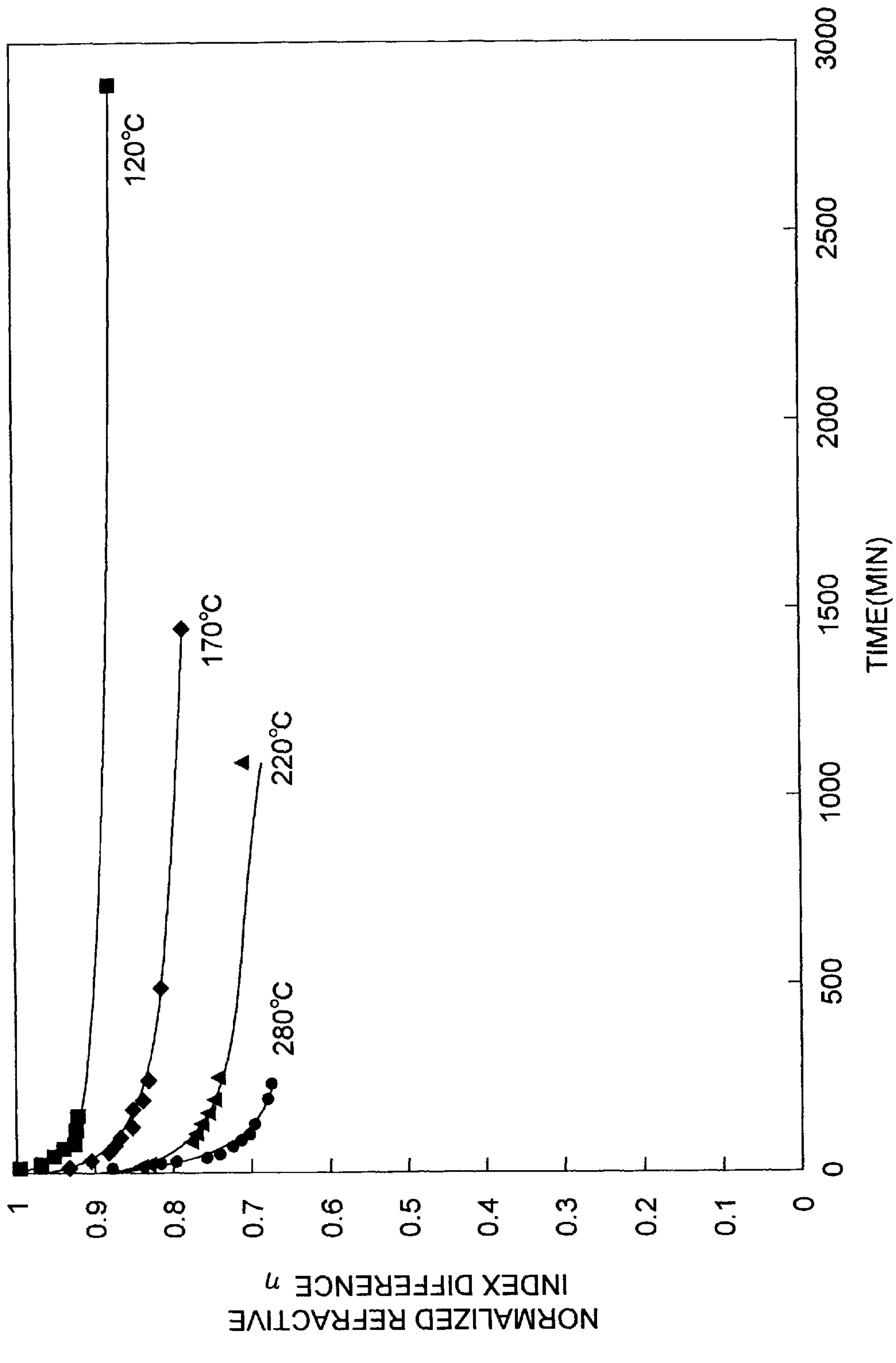
FIG. 2 is a graph showing aged deterioration of normalized refractive index difference η of a grating at each temperature of 120° C., 170° C., 220° C., and 280° C.
Figure 3:
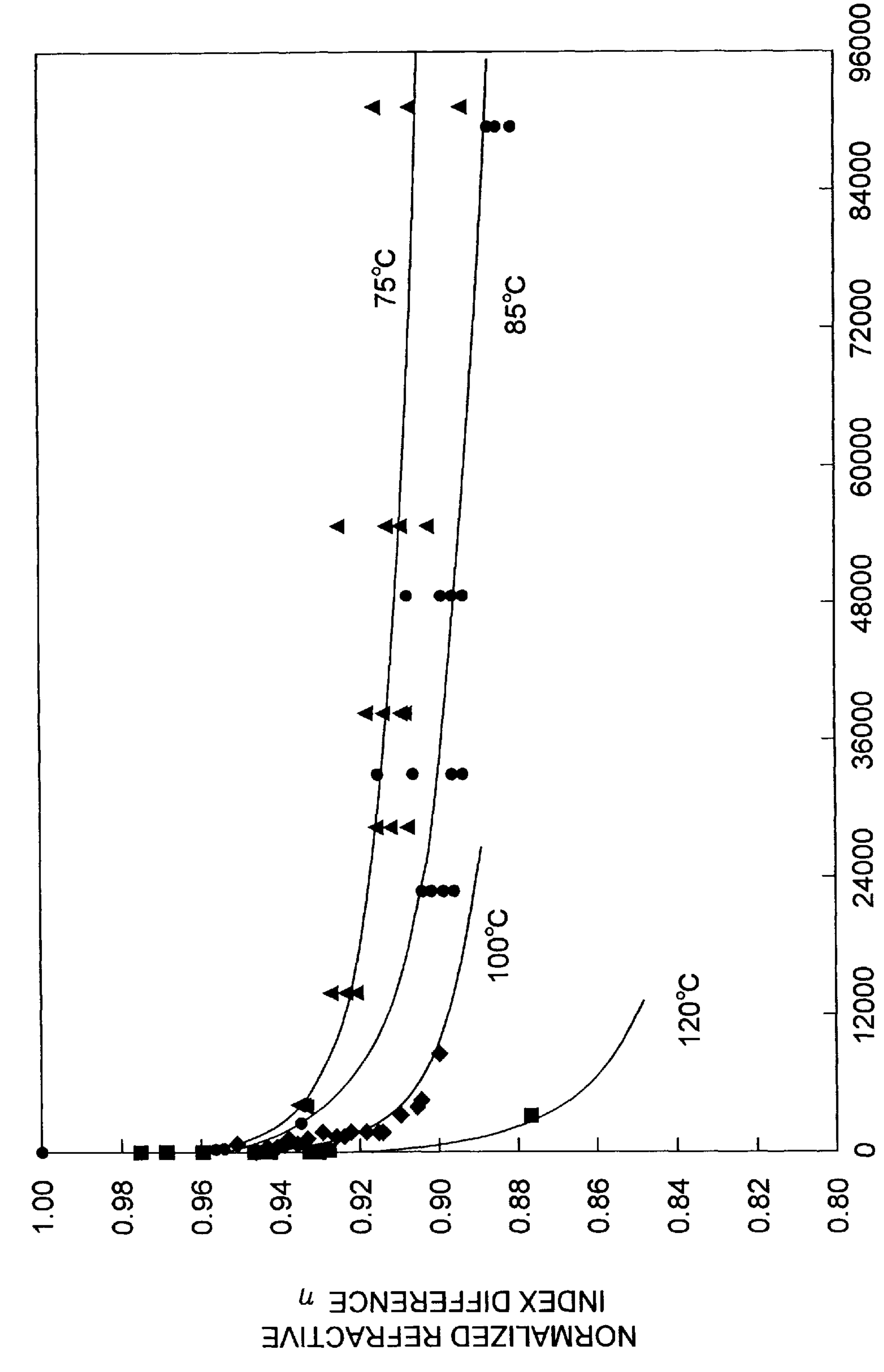
FIG. 3 is a graph showing aged deterioration of normalized refractive index difference η of a grating at each temperature of 75° C., 85° C., 100° C., and 120° C.

FIGS. 2 and 3 are graphs showing measured values of normalized refractive index difference η of a grating at various temperatures, as well as curves fitting these measured values according to expression (2). The grating used for this measurement was photowritten into a silica-based optical fiber, which has a core doped with $GeO_2$, by irradiating the optical fiber with ultraviolet light, as shown in FIG. 1.

Specifically, FIG. 2 shows aged deterioration of normalized refractive index difference η of the grating at each temperature of 120° C., 170° C., 220° C., and 280° C., and FIG. 3 shows aged deterioration of η of the grating at each temperature of 75° C., 85° C., 100° C., and 120° C. over a longer period of time. In these graphs, plotted points indicate the measured values of η, whereas solid lines are curves fitting these measured values according to expression (2). Here, η can be determined by normalizing the refractive index difference Δn of the grating with respect to the refractive index difference Δn0 that is measured after photowriting the grating before heating the optical fiber grating to the above-mentioned temperatures. Namely:

$$\eta = \frac{\Delta n}{\Delta n0} \tag{3}$$

As shown in these graphs, the measured values and the fitting curves correspond to each other very well. In particular, when temperature is 100° C. or higher, the correlation coefficient between the measured values and the curves of expression (2) is 0.94 or higher, thus yielding favorable results. Thus temperature dependence and time dependence of normalized refractive index difference η are represented well by expression (2).

FIG. 4 is a table showing parameters C1 and n concerning the fitting curves shown in FIGS. 2 and 3 for each temperature. The columns of this table successively indicate centigrade temperature, absolute temperature, reciprocal of absolute temperature, parameter n, and parameter C1. As shown in this table, parameter C1 is a constant value (about 1 in this embodiment) regardless of temperature.

Figure 5:
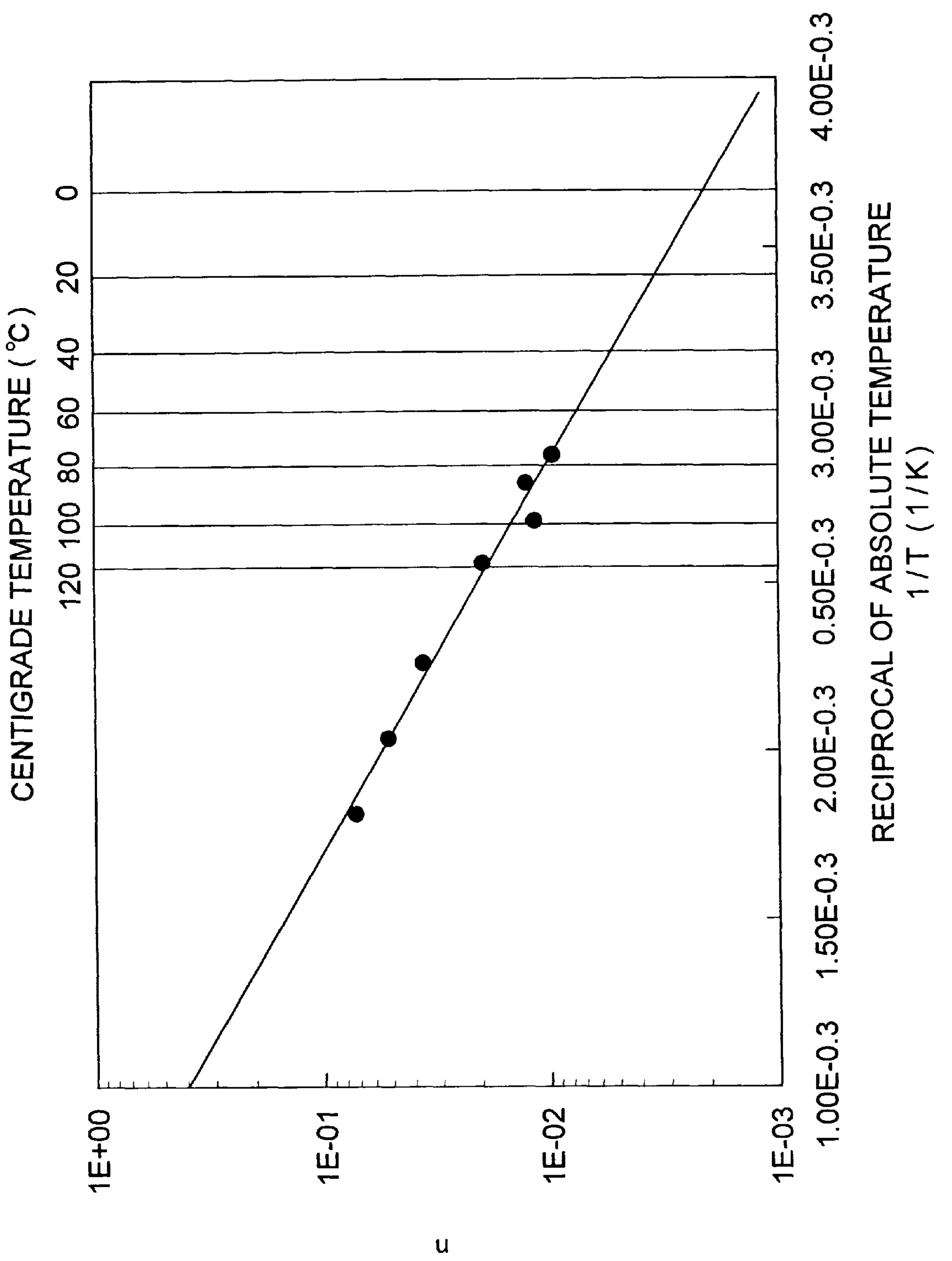
FIG. 5 is a graph showing the relationship between parameter n and temperature.

In the following, temperature dependence of parameter n will be explained. FIG. 5 is a graph showing the relationship between parameter n and absolute temperature T; this relationship was determined by the above-mentioned measurement. In this graph, the ordinate logarithmically indicates parameter n, whereas the abscissa indicates the reciprocal of absolute temperature T, i.e., 1/T. For reference, the upper scale of this graph shows centigrade temperature as well. As this graph shows, parameter n conforms well to Arrhenius' law with respect to absolute temperature T. Consequently, parameter n can be approximately represented by the following general expression:

$$n = A \cdot \exp(-B/T) \tag{4}$$

where A and B are constants independent of temperature. According to the results of the above-mentioned measurement, A and B are 2.7914 and 1963.2, respectively. Therefore, an activation energy of 16.32 kJ/mol is obtained.

Figure 6:
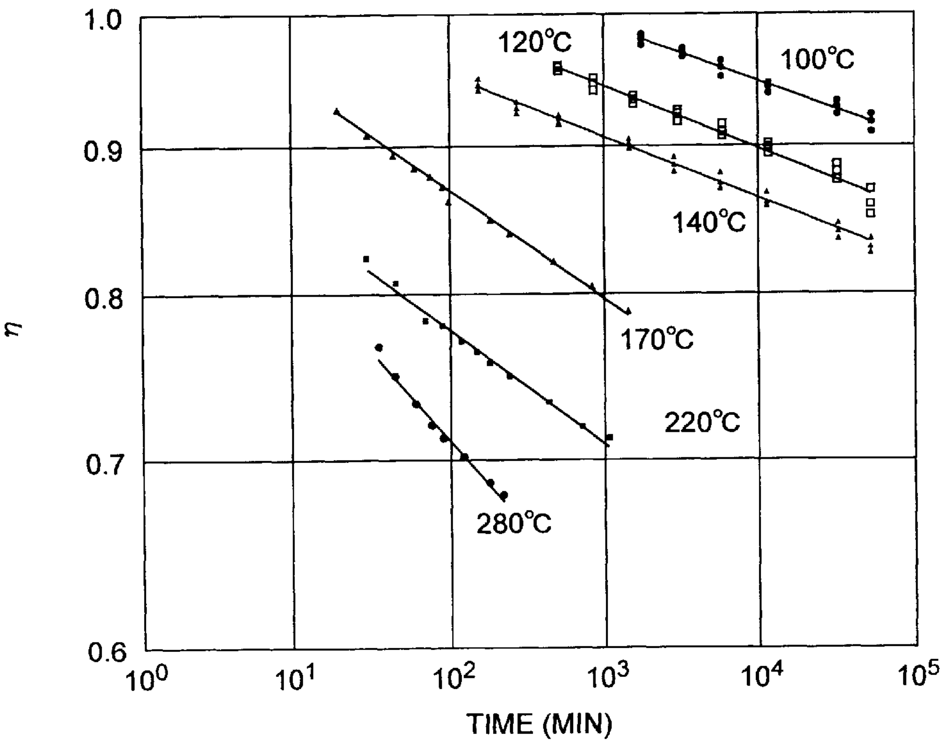
FIG. 6 is a graph showing aged deterioration of normalized refractive index difference η of a grating at each temperature of 100° C., 120° C., 140° C., 170° C., 220° C., and 280° C.
Figure 7:
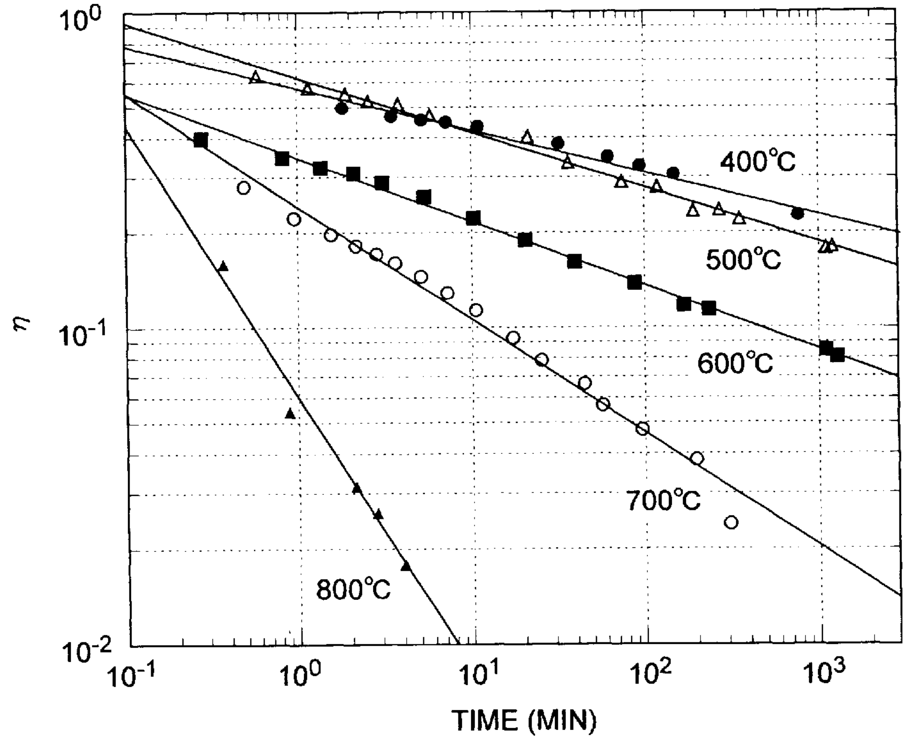
FIG. 7 is a graph showing aged deterioration of normalized refractive index difference η of a grating at each temperature of 400° C., 500° C., 600° C., 700° C., and 800° C.

FIGS. 6 and 7 are graphs showing secular changes in normalized refractive index difference η of the grating measured over temperature ranges wider than those shown in FIGS. 2 and 3. Specifically, FIG. 6 shows aged deterioration of normalized refractive index difference η of the grating at each temperature of 100° C., 120° C., 140° C., 170° C., 220° C., and 280° C., and FIG. 7 shows aged deterioration of η of the grating at each temperature of 400° C., 500° C., 600° C., 700° C., and 800° C. In these graphs, plotted points indicate the measured values of η, whereas solid lines are ones fitting these measured values according to expression (2). Since the ordinate and abscissa in each of FIGS. 6 and 7 are logarithmically indicated, the lines fitting the measured values are linear.

Figure 8:
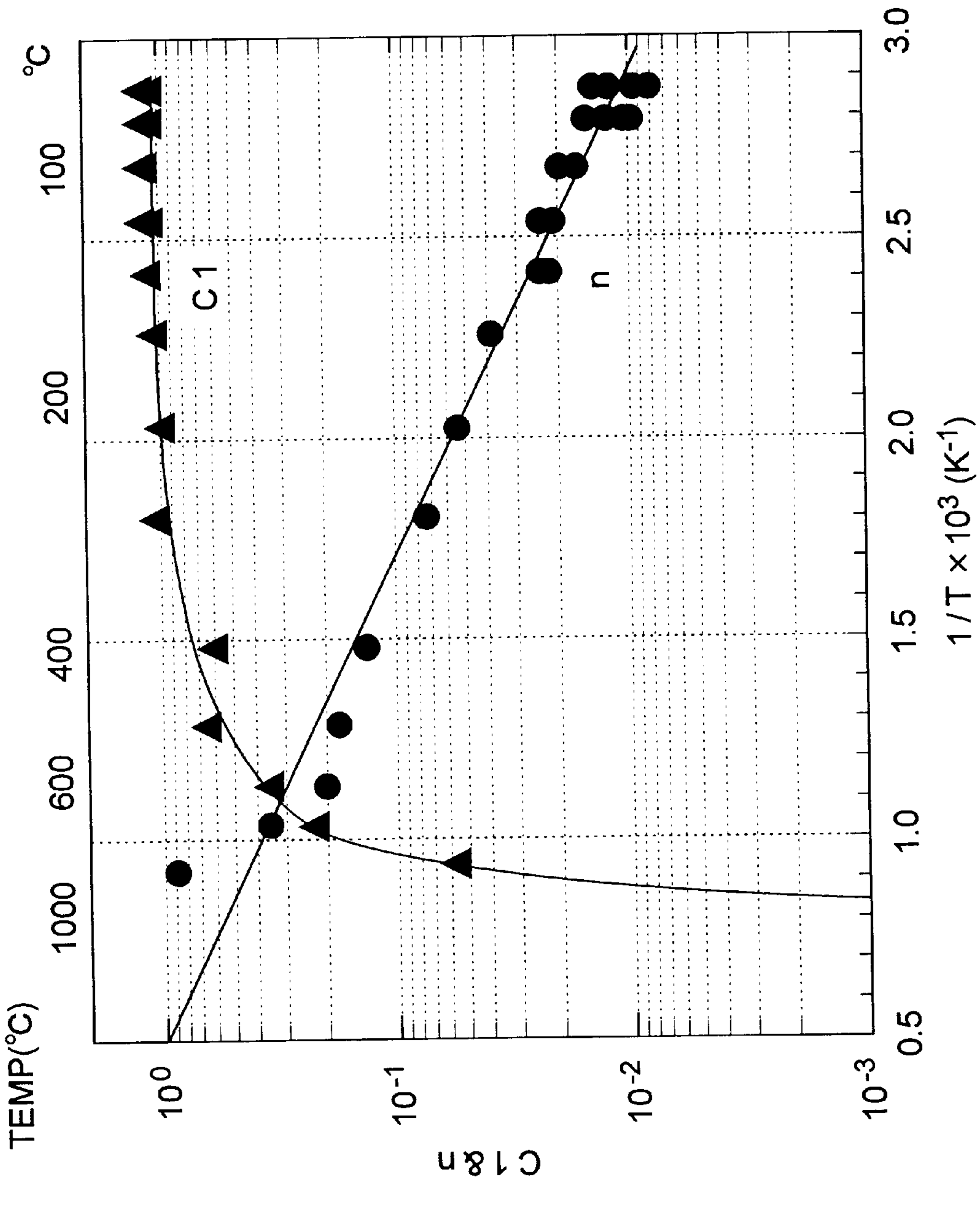
FIG. 8 is a graph showing the relationships between temperature and parameters C1 and n concerning the fitting curves shown in FIGS. 6 and 7.

FIG. 8 is a graph showing the relationships between temperature T and parameters C1 and n corresponding to the fitting lines of FIGS. 6 and 7. As shown in this graph, when temperature is about 300° C. or lower, parameter C1 is substantially independent of temperature and approximately equal to 1. Also, n conforms well to Arrhenius' law with respect to absolute temperature T and can be represented by the above-mentioned expression (4). According to the measured values in FIGS. 6 and 7, A and B are 1.4131 and 1633, respectively. These values differ from those determined from the measured values in FIGS. 2 and 3 since the temperature ranges in which the fitting is performed differ from each other.

As shown in FIGS. 2 to 8, the above-mentioned expression (2) can appropriately represent aged deterioration of an optical fiber grating over a wide temperature range of 75° C. to 800° C. Also, parameter n included in expression (2) indicates Arrhenius-type of temperature dependence in this temperature range. Further, when aged deterioration of an optical fiber grating is represented by expression (2), parameter C1 can be regarded as a constant value (1 in this embodiment) without temperature dependence at a temperature of 300° C. or lower. Accordingly, in this embodiment, normalized refractive index difference η is represented in the form of:

$$\eta = t^{-n} \tag{5}$$

By using expression (4), expression (5) can be modified as:

$$\eta = t^{-A \cdot exp(-B/T)} \tag{6}$$

In this embodiment, expression (6) is used for predicting aged deterioration of the grating. The values of A and B used in the following are 2.7914 and 1963.2, respectively.

Figure 9:
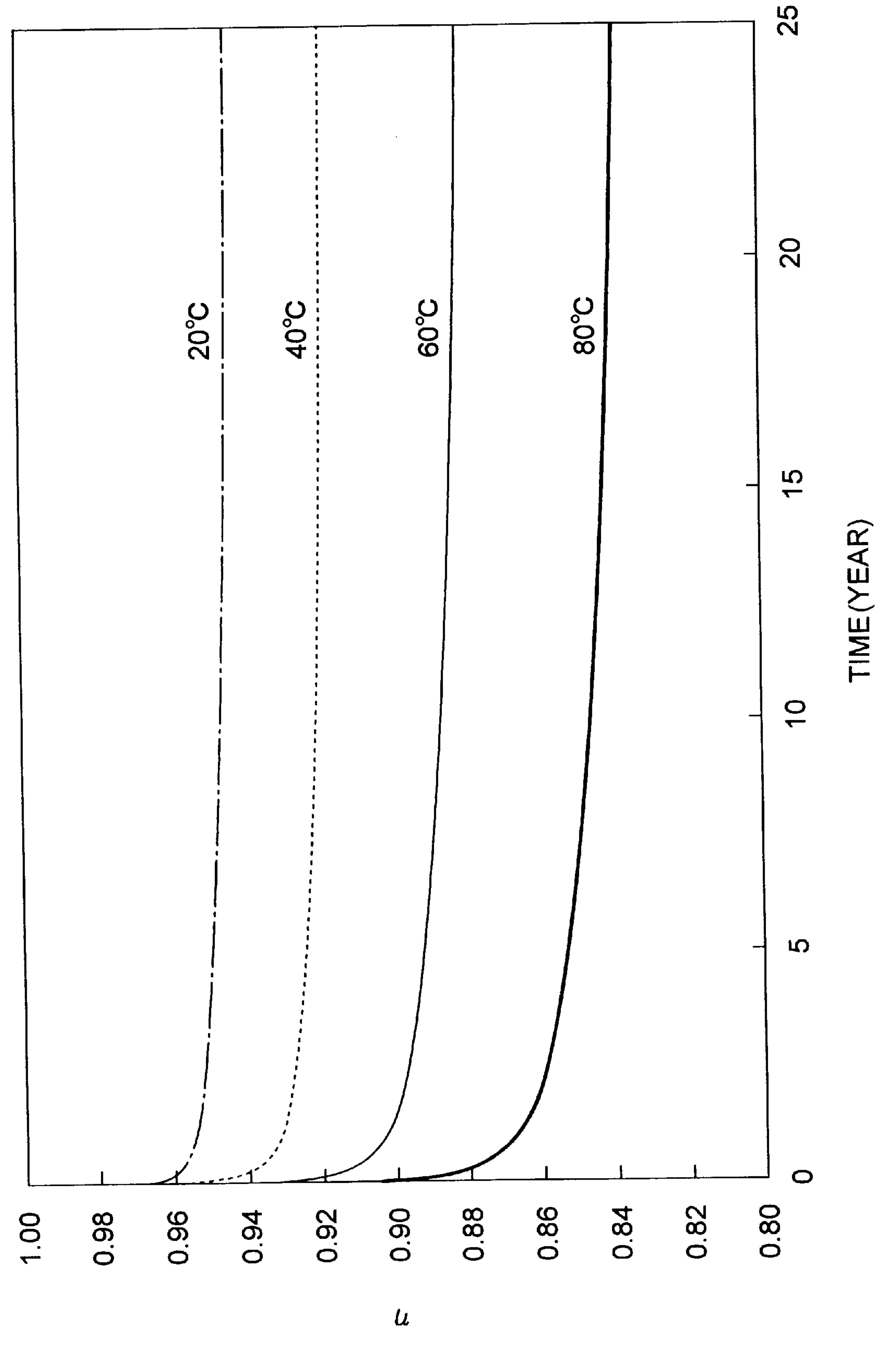
FIG. 9 is a graph showing predicted aged deterioration of normalized refractive index difference when no aging is effected.
Figure 10:
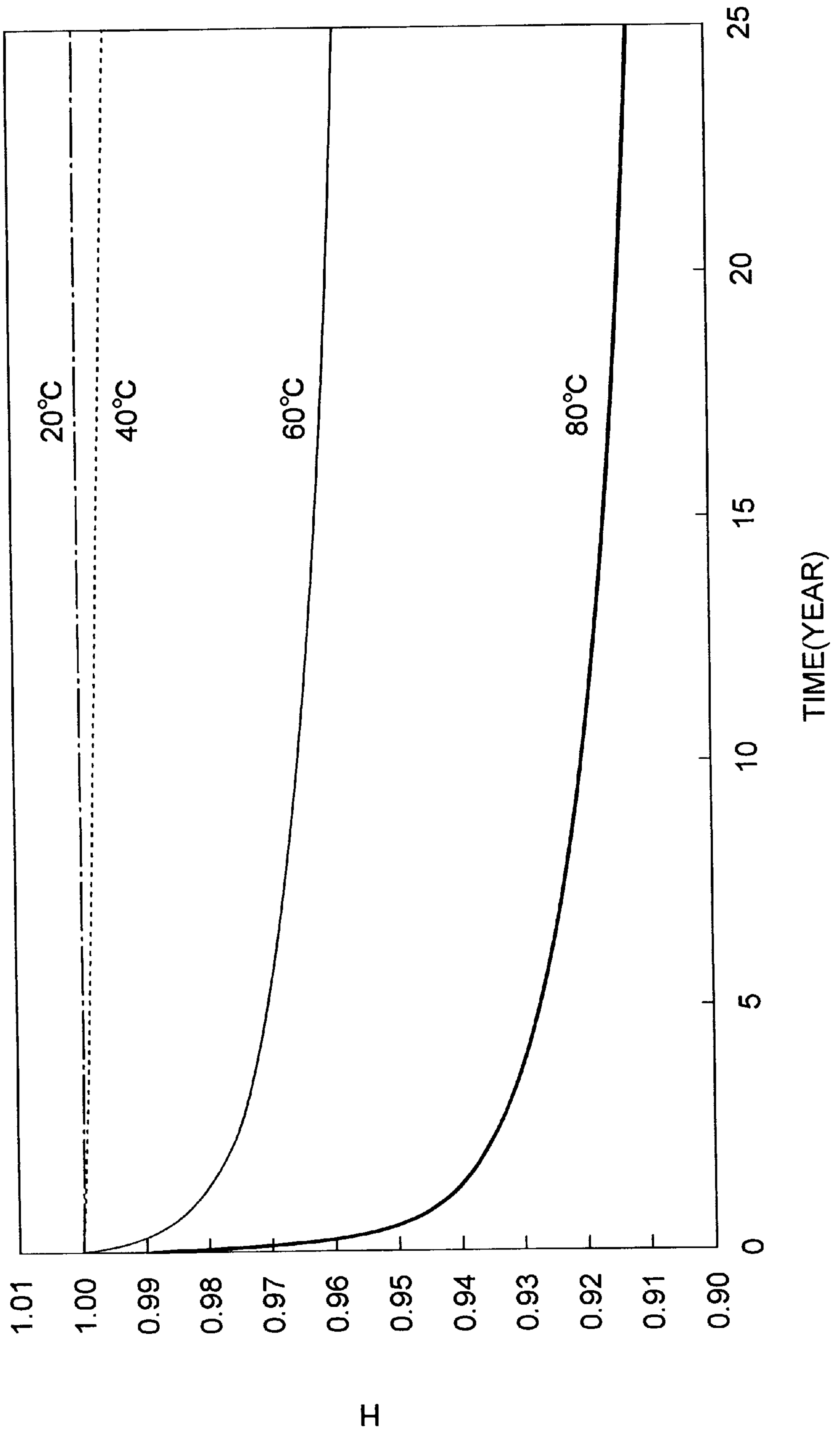
FIG. 10 is a graph showing predicted aged deterioration of normalized refractive index difference after the aging has been effected for 48 hours at a temperature of 80° C.

FIGS. 9 and 10 are graphs showing results of prediction about aged deterioration in normalized refractive index difference of gratings. This prediction is based on expression (6). Specifically, FIG. 9 is a graph showing the predicted aged deterioration in normalized refractive index difference when no aging is effected. FIG. 10 is a graph showing the predicted aged deterioration in normalized refractive index difference at various temperature when the optical fiber grating is subjected to a heat treatment for aging at 80° C. for 48 hours and then maintained at those temperatures. Each graph shows the predicted aged deterioration at each temperature of 20° C., 40° C., 60° C., and 80° C. While the ordinate of the graph in FIG. 9 indicates the above normalized refractive index difference η, the ordinate of the graph in FIG. 10 indicates a new normalized refractive index difference, H. The parameter H is normalized with respect to the refractive index difference at the point of time when the aging is completed. This parameter H will be explained later in greater detail.

Each line in FIG. 9 showing the predicted results of the aged deterioration when no aging is effected can be easily determined by substituting each temperature into the above expression (6). Explained in the following is how to derive the graph of FIG. 10 showing the predicted results of the aged deterioration when the aging is effected.

Figure 11:
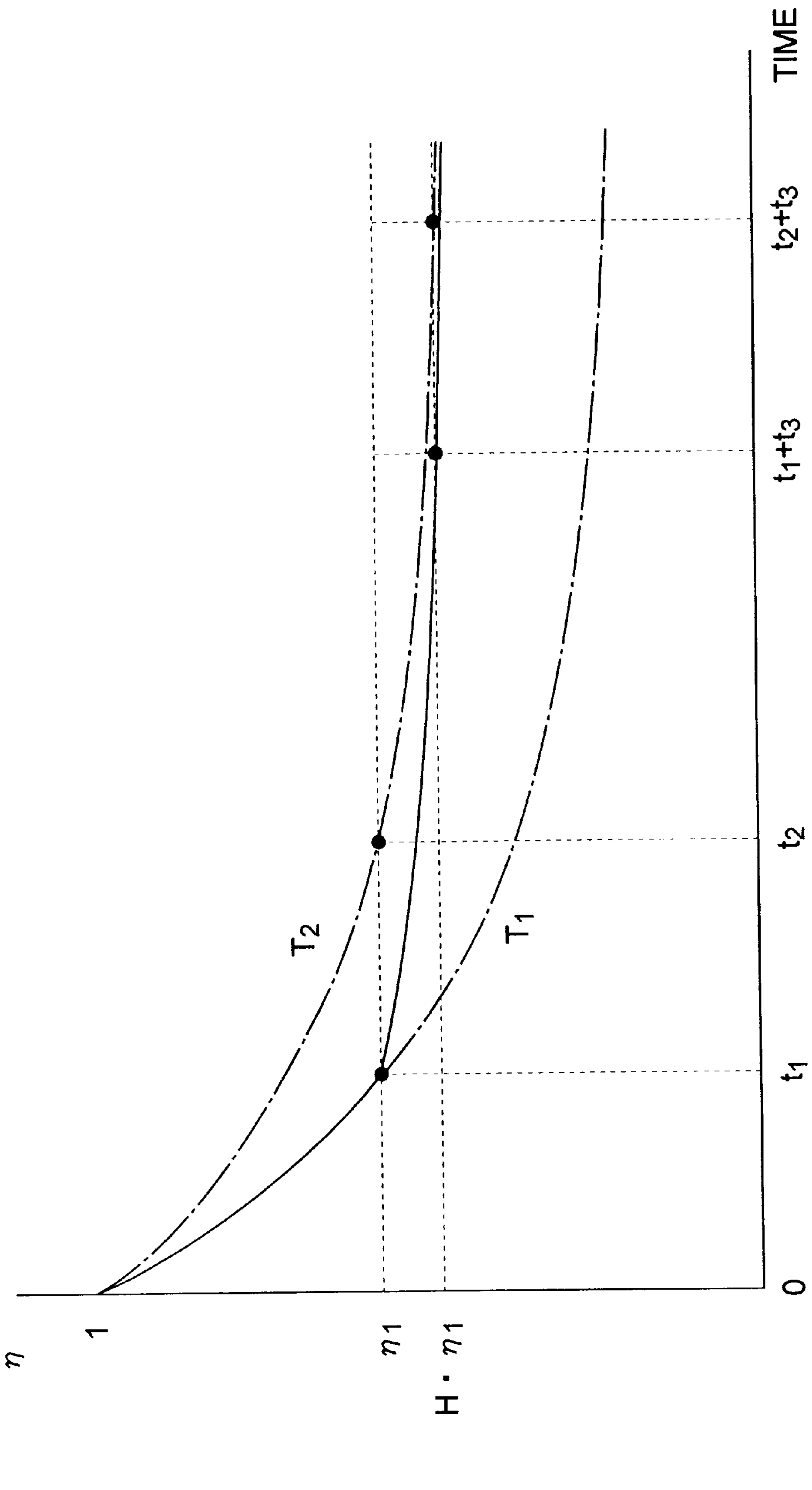
FIG. 11 is a diagram for explaining a method for predicting aged deterioration after aging has been effected.

FIG. 11 is a diagram for explaining a method for predicting the aged deterioration after aging has been effected. In this diagram, T1 indicates temperature of a heat treatment for aging, and T2 indicates operating temperature of the optical fiber grating. A solid line in FIG. 11 shows the secular change of normalized refractive index difference η when the optical fiber grating is aged at the heating temperature of T1 and then is placed in an environment at the operating temperature of T2. On the other hand, two chain lines in FIG. 11 show the predictions of the secular changes of η according to expression (6) when the optical fiber grating is placed in environments at temperatures T1 and T2 respectively.

First, the value of η at the point of time when the aging is completed (heating temperature T1=80° C., and heating time t1=48 hr), η1, is determined. By using the following expression:

$$\eta 1 = t1^{-A \cdot exp(-B/T1)} \tag{7}$$

which is based on expression (6), η1 is computed as η1=0.92. Subsequently determined is time t2 required for η to become η1 if the optical fiber grating is assumed to be placed in an environment at operating temperature T2 after formation of the grating without the aging. The time t2 can be determined from the following expression:

$$t2 = \exp\left(\frac{\ln(\eta 1)}{-A \cdot \exp(-B/T2)}\right) \tag{8}$$

This expression can be derived from the definition of time t2 and the above expression (7).

Prior to the point of time t1, the secular change of η indicated by the solid line of FIG. 11 coincides with the secular change at temperature T1. After the point of time t1, it substantially coincides with the secular change at temperature T2 after η becomes η1, i.e., after the point of time t2. Accordingly, the secular change at temperature T2 after the point of time t2 can be predicted to obtain the graph in FIG. 10.

Here, new normalized refractive index difference H normalized with respect to the refractive index difference at the completion of aging is introduced, and the value of H at the point of time when time period t2 and additional time period t3 have elapsed at temperature T2 is determined. Normalized refractive index difference H is also referred to as "refractive index difference parameter" in this specification, in order to distinguish it from η. Assuming the refractive index difference of the grating to be Δn, the value of the refractive index difference of the grating at the completion of the aging to be $\Delta n1$, and the value of the refractive index difference that is the basis of normalization for $\eta$ to be $\Delta n0$, refractive index difference parameter H is represented by:

$$H=\Delta n/\Delta n1=(\Delta n/\Delta n0)/(\Delta n1/\Delta n0)=\eta/\eta 1 \quad (9)$$

By using expressions (6) and (9), the value of H at the point of time when time period t2 and t3 have elapsed at temperature T2 is determined as:

$$H=(t3+t2)^{-A\cdot exp(-B/T2)}/\eta 1 \quad (10)$$

FIG. 10 shows the relationship between time t3 and parameter H represented by this expression (10) with respect to each operating temperature T2 (=20° C., 40° C., 60° C., and 80° C., respectively). Thus the aged deterioration of the grating after the aging can be predicted.

As shown in FIG. 9, when no aging is effected, the normalized refractive index difference is expected to deteriorate by 4% or more due to the lapse of only 1 year even at a relatively low operating temperature of 20° C., and the aged deterioration becomes greater as the operating temperature is higher. By contrast, as shown in FIG. 10, it is predicted that the normalized refractive index difference after the aging does not substantially deteriorate even after the lapse of 25 years at the operating temperature of 20° C., and that the deterioration is only about 0.5% even after the lapse of 25 years at the operating temperature of 40° C. Accordingly, it can be seen that a sufficient reliability for the optical fiber grating can be secured if the aging is effected. Even if the aging (at 80° C. for 48 hours) is effected, however, at the operating temperature of 60° C., the deterioration after the lapse of 25 years is predicted to be about 4%, and at the operating temperature of 80° C., the deterioration after the lapse of 25 years is predicted to be about 9%. Thus, it is not appropriate to uniformly set the condition of the aging without taking into account the actual operating temperature and operating time of the optical fiber grating.

Therefore, in the method in accordance with this embodiment, one or more aging conditions (i.e., at least one of value $\eta 1$ of the normalized refractive index difference at the completion of the aging, aging temperature T1, and aging time t1) is appropriately determined according to the above expression (6) in consideration of the operating temperature at which and operating time for which the optical fiber grating is actually used and the allowable value of refractive index difference parameter H. In the following, a method for determining the aging condition will be specifically explained.

The method in accordance with this embodiment aims to make an optical fiber grating designed so that the decrease in refractive index difference parameter H is suppressed within a predetermined tolerance when used for operating time t3 at operating temperature T2. Accordingly, the aging condition is determined so that parameter H of the grating is not lower than a predetermined minimum allowable value, $H_m$, when the grating has been placed in an environment at operating temperature T2 for operating time t3. The operating temperature T2, operating time t3, and minimum allowable value $H_m$ are preset in view of a use of the optical fiber grating, an environment where it is used, and so forth.

In this method, the value $\eta 1$ of the normalized refractive index difference at the completion of the aging is determined so as to satisfy both of the following two expressions:

$$H_m \leq (t3+t2)^{-A\cdot exp(-B/T2)}/\eta 1 \quad (11a)$$

$$t2 = \exp\left(\frac{\ln(\eta 1)}{-A\cdot\exp(-B/T2)}\right) \quad (11b)$$

The solutions of these expressions can be computed when the operating temperature T2, operating time t3, and minimum allowable value $H_m$ are set.

Figure 12:
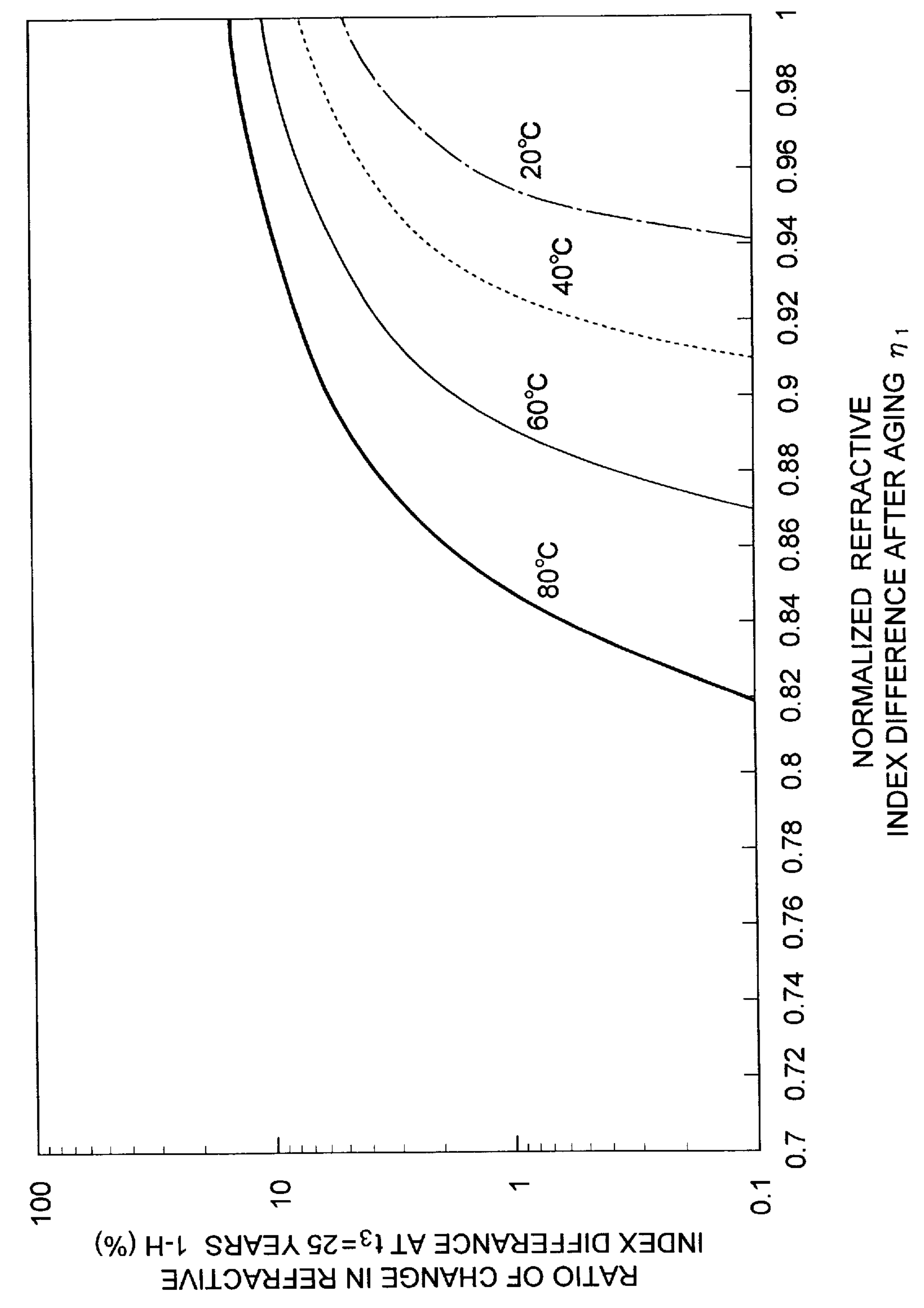
FIG. 12 is a graph showing, for each operating temperature, the relationship between value η1 of the normalized refractive index difference after aging and a ratio of change of refractive index difference due to the lapse of operating time t3.
Figure 13:
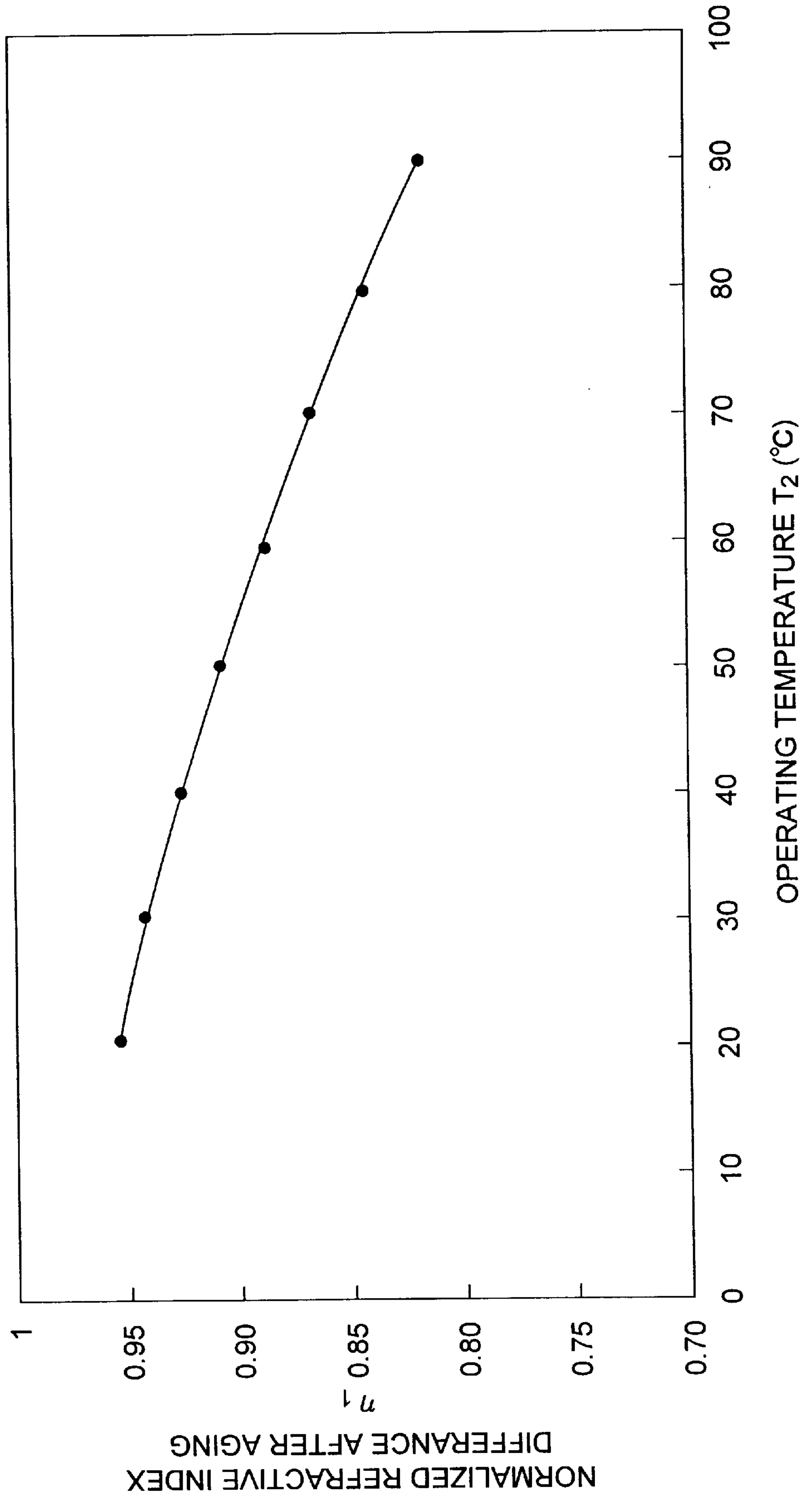
FIG. 13 is a graph showing value η1 of the normalized refractive index difference after aging, which is required for the ratio of change of refractive index (1−H) to be 1% or less if the operating time t3 is 25 years.

FIG. 12 is a graph showing the relationship between the value $\eta 1$ of normalized refractive index difference immediately after the aging and the ratio of the change of the refractive index difference due to the lapse of operating time t3 if operating time t3 is 25 years, for each operating temperature T2 (20° C., 40° C., 60° C., and 80° C., respectively). The ratio of the change of the refractive index difference, i.e., $(\Delta n1-\Delta n)/\Delta n1$, may be represented as (1−H) with the above parameter H. FIG. 13 is a graph showing the value of $\eta 1$ required for the ratio (1−H) to be 1% or less if operating time t3 is 25 years, for each operating temperature T2.

As can be seen from those graphs, in order to achieve a generally required reliability standard (the standard is such that the ratio (1−H) is 1% or less, i.e., $H_m$=0.99 if operating time t3 is 25 years), it is necessary for the aging to be effected so that normalized refractive index difference at the completion of the aging, $\eta 1$, is about 95.5% or less if the operating temperature is 20° C., about 92.5% or less if 40° C., about 89.0% or less if 60° C., and about 84.5% or less if 80° C., respectively.

In the foregoing manner, the value $\eta 1$ of normalized refractive index difference at completion of the aging, which is one of the aging conditions, is determined according to operating temperature T2, operating time t3, and minimum allowable value $H_m$ of refractive index difference parameter H. The aging, i.e., heat treatment, of the grating can be effected till normalized refractive index difference $\eta$ reaches the determined value $\eta 1$ to obtain an optical fiber grating in which the deterioration of the refractive index difference is suppressed within a predetermined tolerance under the conditions of operating temperature T2 and operating time t3.

Figure 14:
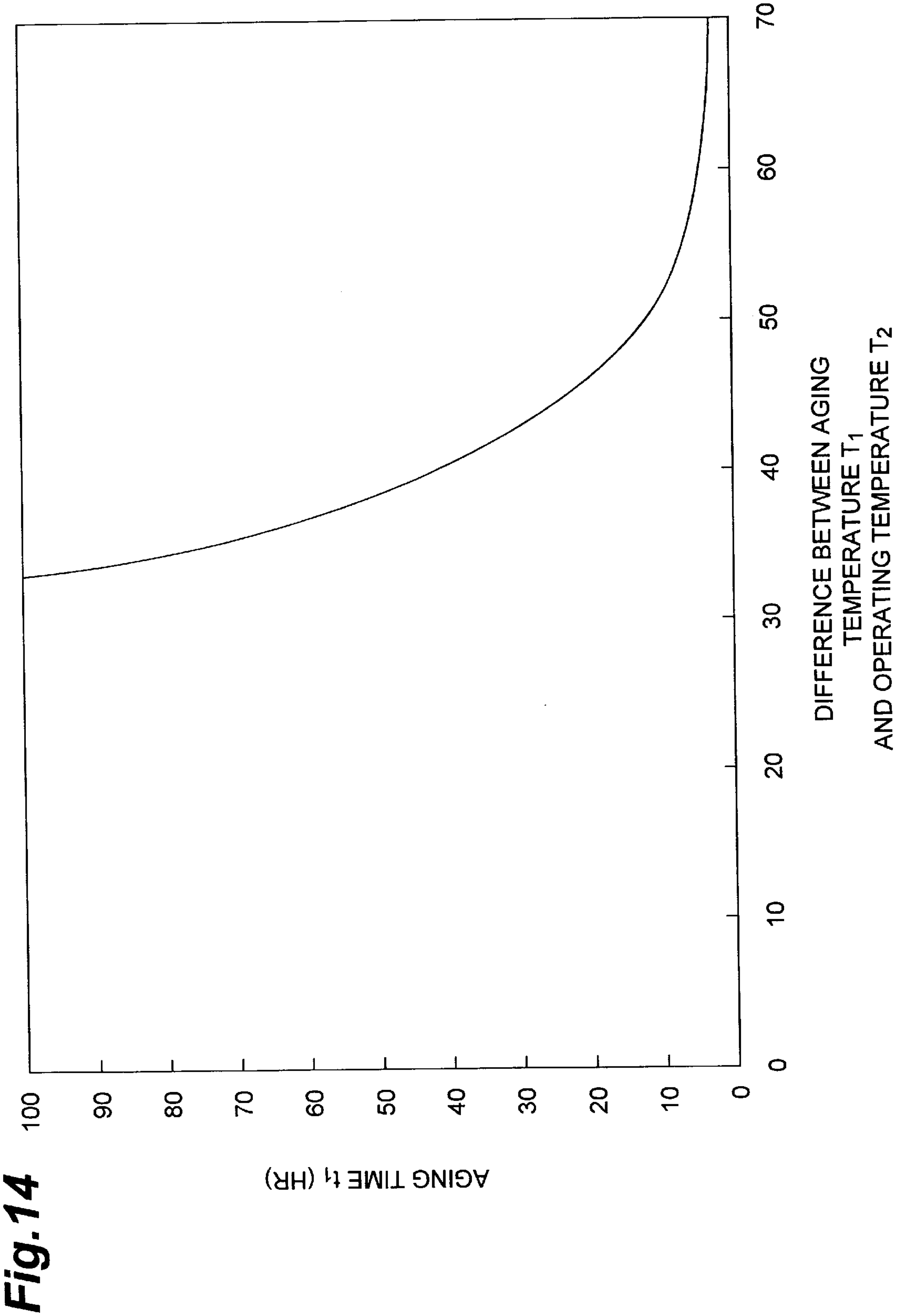
FIG. 14 is a graph showing the relationship between aging temperature T1 and aging time t1.

As more specific conditions of the aging, the temperature and time of the heat treatment for the aging can also be determined. Namely, aging temperature T1 and aging time t1 that can achieve the above determined $\eta 1$ may be determined according to expression (7). In this case, aging temperature T1 and aging time t1 cannot be determined uniquely. FIG. 14 is a graph showing the relationship between aging temperature T1 and aging time t1; this relationship was determined according to expression (7). This graph indicates the relationship if operating time t3 is 25 years, operating temperature T2 is 20° C., and the allowable maximum ratio of the change of the refractive index difference is 1%. The ordinate of this graph indicates aging time t1, whereas the abscissa indicates difference between aging temperature T1 and operating temperature T2, i.e., (T1−T2). As can be seen from this graph, the higher aging temperature T1, becomes shorter aging time t1 becomes shorter. For example, if aging temperature T1 is 40° C. or more above operating temperature T2, aging time t1 is only 40 hours or less, as is preferable. Also if aging temperature T1 is 50° C. or more above operating temperature T2, aging time t1 is only 13 hours or less, as is more preferable.

In the following, another method for determining the aging condition in accordance with the present invention will be explained. First, in this method, provisional values $T1_p$ and $t1_p$ for heating temperature T1 and heating time t1 are set. Subsequently predicted is value $\eta 1_p$ of the normalized refractive index difference at completion of the aging if the aging is effected at heating temperature $T1_p$ for heating time $t1_p$ is predicted. Specifically, substituting $T1_p$ and $t1_p$ into expression (6) yields the predicted value $\eta 1_p$ as follows:

$$\eta 1_p = t1_p^{-A \cdot exp(-B/T1_p)} \quad (12)$$

Subsequently, time $t2_p$ required for normalized refractive index difference $\eta$ to become the predicted value $\eta 1_p$ due to the aged deterioration at operating temperature T2 is determined from the following expression:

$$t2_p = \exp\left(\frac{\ln(\eta 1_p)}{-A \cdot \exp(-B/T2)}\right) \quad (13)$$

Then, assuming that the aging is effected at temperature $T1_p$ for time $t1_p$, the predicted value $H_p$ of parameter H of the optical fiber grating that has been used for operating time t3 at operating temperature T2 after this aging is determined by use of the following expression:

$$H_p = (t3 + t2_p)^{-A \cdot exp(-B/T2)} / \eta 1_p \quad (14)$$

Thereafter, thus predicted value $H_p$ is compared with the minimum value $H_m$ of parameter H that is allowable under the conditions of operating temperature T2 and operating time t3. When $H_p \geqq H_m$, $\eta 1_p$, $T1_p$ and $t1_p$ are judged to be appropriate aging conditions, whereby the process for determining the aging condition is completed. When $H_p < H_m$, by contrast, $\eta 1_p$ determined above is judged to be inappropriate, whereby provisional heating temperature $T1_p$ and provisional heating time $t1_p$ are reset. Preferably, this resetting operation is effected so that $\eta 1_p$ is made smaller to make predicted refractive index difference parameter $H_p$ greater. Thereafter, the steps mentioned above are repeated until appropriate value for $\eta 1_p$, $T1_p$ and $t1_p$ are determined.

In the following, the method for making an optical fiber grating in accordance with an embodiment of the present invention will be explained. Referring to FIG. 1, a silica-based optical fiber 10 having the core region doped with germanium dioxide ($SiO_2$+$GeO_2$) is prepared in this method. In this embodiment, though the cladding region 14 of the optical fiber 10 is substantially pure silica ($SiO_2$), it may be doped with $GeO_2$. The optical fiber 10 is irradiated with an interference fringe formed by use of light 30 having a predetermined wavelength (e.g., wavelength shorter than 260 nm). This causes a refractive index change corresponding to the optical energy intensity distribution of the interference fringe in the optical fiber 10, whereby a grating 20 is formed. Thereafter, the grating 20 is subjected to a heat treatment, so as to cause initial accelerated deterioration of the grating 20, thus performing the aging.

This heat treatment can be effected according to a condition or conditions determined by any of the above-mentioned methods. For example, the grating 20 may be heat-treated, with normalized refractive index difference $\eta$ of the grating 20 being monitored, till $\eta$ reaches the value $\eta 1$ (or $\eta 1_p$) determined according to the present invention. $\eta 1$ (or $\eta 1_p$) determined according to the present invention. Alternatively, the heat treatment may be effected with the temperature T1 (or $T1_p$) and time t1 (or $t1_p$) determined according to the present invention. Consequently, the heat treatment can be effected without monitoring normalized refractive index difference $\eta$. In the grating 20 that has been subjected to such a heat treatment, a decrease in refractive index difference parameter H is suppressed within a predetermined tolerance when used at operating temperature T2 for operating time t3. Upon completion of this heat treatment, the making of an optical fiber in accordance with this embodiment is completed.

As explained in detail in the foregoing, since only one parameter n dependent on temperature is used to express normalized refractive index difference $\eta$ in the present invention, the condition of the aging can be determined relatively easily.

Also, in the method for making an optical fiber grating in accordance with the present invention, it is possible to yield an optical fiber grating having a desired reliability so as to suppress the aged deterioration within a predetermined tolerance with a predetermined operating temperature and operating time.

Though the aged deterioration curve of the optical fiber grating is represented by expression (6) in the foregoing, the inventor also proposes to represent the aged deterioration curve as follows:

$$\eta = (t/\tau)^{-n} = \tau^n \cdot t^{-n} \quad (15)$$

When this expression and the above-mentioned expression (2) are compared with each other, it can be seen that parameter C1 in expression (2) coincides with the nth power of parameter $\tau$ in expression (15). This parameter $\tau$ exhibits Arrhenius-type temperature within the temperature range of 75° C. to 800° C. where the inventor carried out the measurement dependence, similar to parameter n. Namely, T can be expressed as follows:

$$\tau = A' \cdot \exp(B'/T) \quad (16)$$

where A' and B' are constants independent of temperature.

Figure 15:
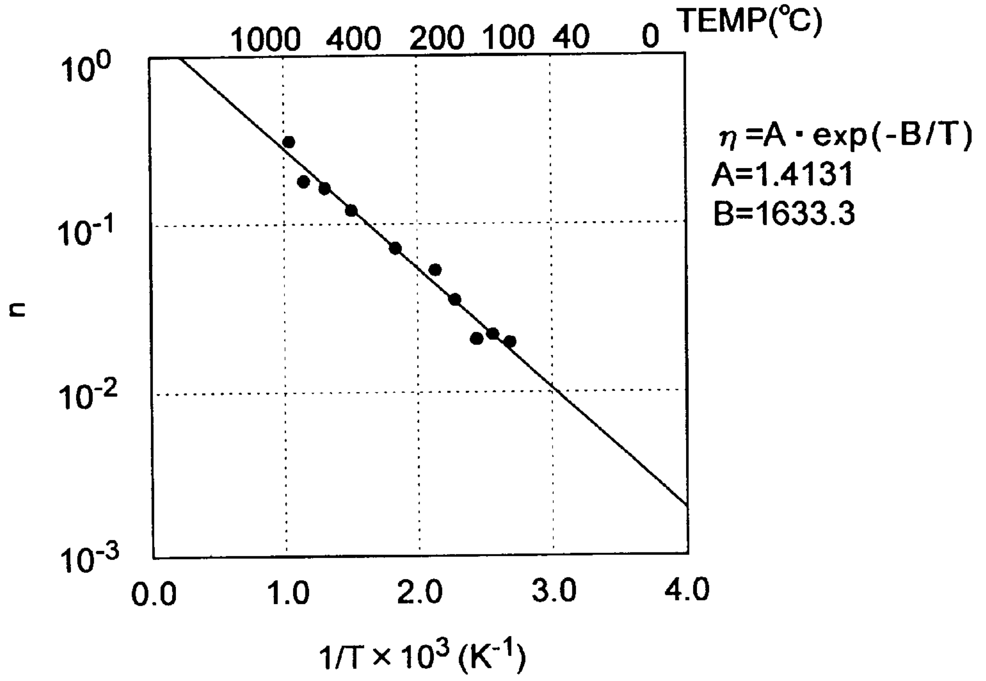
FIG. 15 is a graph showing the relationship between parameter n and temperature.
Figure 16:
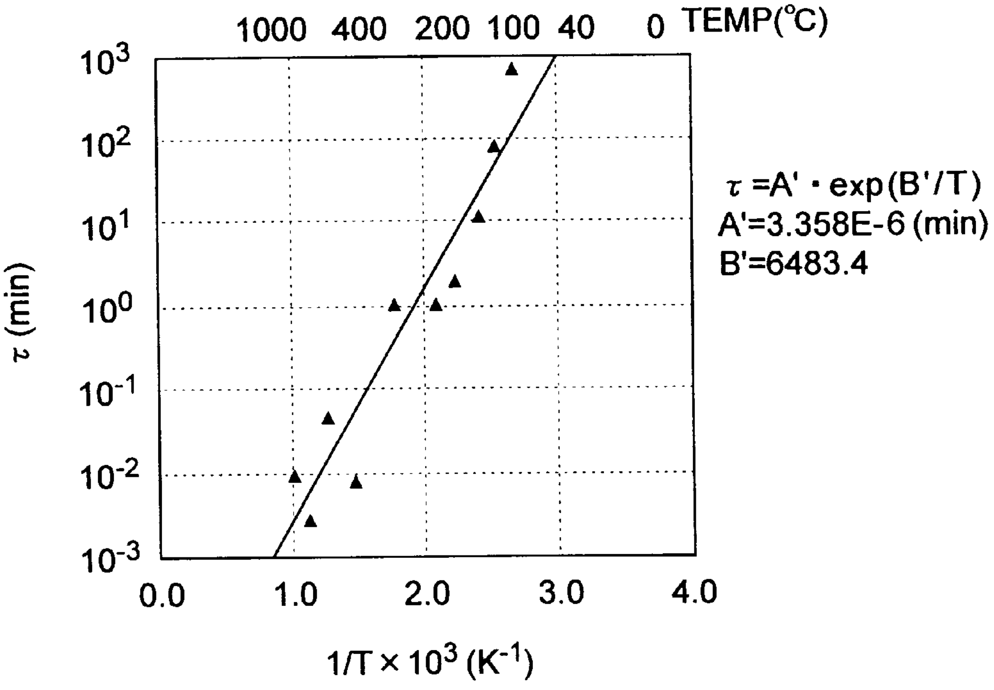
FIG. 16 is a graph showing the relationship between parameter τ and temperature.

FIG. 15 is a graph showing the relationship between parameter n and temperature, and FIG. 16 is a graph showing the relationship between parameter $\tau$ and temperature. When aged deterioration of a grating is predicted by use of expression (15), the computation required may be complicated since both of two parameters $\tau$ and n have temperature dependence. Nevertheless, for example, if the optical fiber grating is used in a high-temperature environment where it is inadequate to regard parameter C1 in expression (2) as a constant value, it is effective that the aged deterioration curve is determined as represented by expression (15).

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for making an optical fiber grating wherein said optical fiber grating is designed so that when used for a predetermined operating time at a predetermined operating temperature, its deterioration is suppressed within a predetermined tolerance, said method comprising:

forming a grating at a region in an optical fiber; and aging said grating under a condition determined according to a method comprising:

setting an aged deterioration curve of said optical fiber grating as a form proportional to $t^{-n}$, where t represents time, and n represents a parameter dependent on temperature; and determining said condition of the aging according to said aged deterioration curve.

2. A method according to claim 1, wherein said parameter n is expressed as follows:

$$n = A \cdot \exp(-B/T)$$

where:

A and B are constants; and

T is temperature.

3. A method according to claim 1, wherein said determining said condition further comprises determining a value $\eta 1$ satisfying the following two expressions:

$$H_m \leqq (t3+t2)^{-A\cdot exp(-B/T2)}/\eta 1$$

$$t2=\exp(\ln(\eta 1)/(-A\cdot \exp(-B/T2)))$$

where:

$H_m$ is a predetermined minimum allowable value;

T2 is the predetermined operating temperature of said optical fiber grating; and t3 is the predetermined operating time of said optical fiber grating.

4. A method according to claim 3, wherein said determining said condition further comprises determining, according to said value $\eta 1$, a temperature T1 and a time t1 of to be used in a heat treatment included in the aging.

5. The method according to claim 4, wherein said heating temperature T1 and said heating time t1 are set so as to satisfy the following expression:

$$\eta 1=t1^{-A\cdot exp(-B/T1)}.$$

6. The method according to claim 4, wherein said heating temperature T1 is 40° C. or more above said operating temperature T2.

7. The method according to claim 1, wherein said determining said condition comprises:

setting a provisional temperature $T1_p$ and a provisional time $t1_p$ of a heat treatment included in the aging;

using said temperature $T1_p$ and time $t1_p$ to determine a value $\eta 1_p$ represented by the following expression:

$$\eta 1_p=t1_p^{-A\cdot exp(-B/T1p)}$$

using said value $\eta 1_p$ so as to determine a time $t2_p$ represented by the following expression:

$$t2_p=\exp(\ln(\eta 1_p)/(-A\cdot \exp(-B/T2)))$$

where T2 is the predetermined operating temperature of said optical fiber grating;

using thus determined time $t2_p$ and said value $\eta 1_p$ so as to determine a value $H_p$ represented by the following expression:

$$H_p=(t3+t2_p)^{-A\cdot exp(-B/T2)}/\eta 1_p$$

where t3 is the predetermined operating time of said optical fiber grating; and comparing thus determined value $H_p$ with a predetermined minimum allowable value $H_m$, and defining said value $\eta 1_p$, temperature $T1_p$, and time $t1_p$ as said conditions of the aging when $H_p \geqq H_m$.

8. A method according to claim 7, wherein said determining said condition comprises resetting said provisional temperature $T1_p$ and said provisional time $t1_p$ when said comparison results in $H_p<H_m$, and repeating said determining the value $\eta 1_p$, determining the time $t2_p$, determine the value $H_p$, and comparing $H_p$ with $H_m$.

9. A method according to claim 7, wherein said provisional temperature $T1_p$ is 40° C. or more above said operating temperature T2.

* * * * *